(12) United States Patent
Sojian (10) Patent No.: US 8,228,515 B2
(45) Date of Patent: Jul. 24, 2012

(54) PRINTER JOB LANGUAGE SUSPENSION

(75) Inventor: Lena Sojian, Fountain Valley, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1087 days.

(21) Appl. No.: 12/037,883

(22) Filed: Feb. 26, 2008

(65) Prior Publication Data

US 2009/0213403 A1  Aug. 27, 2009

(51) Int. Cl.
*G06F 3/12* (2006.01)
*G06F 9/44* (2006.01)
*G06F 9/45* (2006.01)
*G06K 15/00* (2006.01)

(52) U.S. Cl. ........... 358/1.13; 358/1.14; 358/1.15; 717/106; 717/112; 717/120; 717/136

(58) Field of Classification Search ............ 358/1.13, 358/1.14, 1.15, 1.16, 1.18, 1.9, 2.1, 501, 358/503; 345/533, 502; 717/106, 112, 120, 717/136, 237
See application file for complete search history.

(56) References Cited

U.S. PATENT DOCUMENTS

2005/0068560 A1* 3/2005 Ferlitsch ............ 358/1.13
2006/0055952 A1* 3/2006 Ferlitsch ............ 358/1.13

FOREIGN PATENT DOCUMENTS

| JP | 11-078168 | 3/1999 |
|---|---|---|
| JP | 2001-265541 | 9/2001 |
| JP | 2001-293911 | 10/2001 |
| JP | 2005-025303 | 8/2006 |
| JP | 2007-136910 | 6/2007 |

OTHER PUBLICATIONS

HP, PCL/PJL Reference, Apr. 1999, 11th Edition, pp. 1-338.*
HP, Pint Job Language, Oct. 1997, 10th Edition, pp. 1-309.*
Hewlett_packard, LaserJet and Color LaserJet MFP, Jan. 18, 2008, pp. 1-69.*
CFM, Chapter 5 PJL Printer Job Language, Jul. 26, 2004, pp. 1-66.*

* cited by examiner

*Primary Examiner* — Benny Q Tieu
*Assistant Examiner* — Ngon Nguyen
(74) *Attorney, Agent, or Firm* — Law Office of Gerald Maliszewski; Gerald Maliszewski (57) ABSTRACT

A method is provided for temporarily disabling printer job language (PJL) commands in a printer device. In a printer device, an electronically formatted print job is accepted with embedded PJL commands. The method parses the print job, and in doing so, differentiates a first PJL command and a PJL disable command. The print job is automatically processed (as is conventional), while temporarily ignoring the first PJL command in response to the PJL disable command. In one aspect, the printer differentiates the first PJL command enveloping the print job, and the PJL disable command enveloping the first PJL command envelope.

23 Claims, 7 Drawing Sheets

ENABLE INTERFACE

| PJL Command | Standard PJL Processor<br>PJL Processor |
|---|---|
| DEFAULT | DEFAULTfunction |
| ECHO | ECHOfunction |
| ENTER | ENTERfunction |
| INITIALIZE | INITIALIZEfunction |
| INFO | INFOfunction |
| INQUIRE | INQUIREfunction |
| RESET | RESETfunction |
| SET | SETfunction |
| JOB | JOBfunction |
| EOJ | EOJfunction |
| ... | ... |

DISABLE INTERFACE

| PJL Command | Disable PJL Processor<br>PJL Processor |
|---|---|
| DEFAULT | NULL |
| ECHO | NULL |
| ENTER | NULL |
| INITIALIZE | NULL |
| INFO | NULL |
| INQUIRE | NULL |
| RESET | NULL |
| SET | NULL |
| JOB | NULL |
| EOJ | NULL |
| ... | ... |

PRINTER JOB LANGUAGE SUSPENSION

BACKGROUND OF THE INVENTION

1. Field of the Invention

This invention generally relates to printer-related software and, more particularly, to a method for temporarily disabling print job language (PJL) commands in a print job.

2. Description of the Related Art

Most print-ready files today contain some form of PJL commands. These commands are typically generated by print drivers and attached to the print data prior to the print data being sent to a multifunctional peripheral (MFP) or printer. PJL commands add job level controls, such as printer language switching, job separation, environment, status readback, device attendance, and file system commands. PJL commands typically reside above all the other printer languages, and are the first to be parsed when a print job is processed. Although PJL commands are fairly common and supported by most MFPs and printers, there are many applications that require the processing of raw print data, without the added PJL commands.

Print jobs sourced from an open operating system (OS) ideally should only include raw print data, with no PJL commands, to insure that the open OS print job settings are not overwritten by PJL commands internal to the print job. However, since many print-ready files already contain PJL commands, it becomes necessary to provide a method of stripping the PJL data from the original print content when using open OS applications to submit print jobs.

One method of stripping PJL commands from a print file is to use a utility to parse the original print file, identifying and extracting all PJL commands from the file. Although this procedure is generally done on the host computer before the print data is submitted to the MFP, it may also be done on the MFP after the entire file has been transferred to the MFP. However, there are several drawbacks to this method.

Removing PJL commands from the original print file is an invasive procedure. Because the original print content is modified, the integrity of the print data is compromised. This print content modification may be undesirable for security-sensitive print files. Parsing the entire print file to extract PJL commands adds undesirable overhead to the print performance. Further, the parsing can only be done after the entire file has been received, which adds delay and overhead to the printing process.

It would be advantageous if a printer could temporarily ignore PJL commands in selected printed jobs.

SUMMARY OF THE INVENTION

Presented herein is a method for stripping PJL commands from a print job without affecting the original print content, or impacting print performance. This method uses a control command added to the beginning of the print stream that results in the MFP ignoring the PJL commands in that job. PJL commands are still recognized and parsed by the printer, but the actual processing of the PJL commands is bypassed. Ignoring PJL commands has the same effect as having no PJL commands. No parsing is required to remove PJL commands and no additional processing is required on the host computer. No additional overhead is added to print job. The method dynamically disables PJL on a print job-by-print job basis. Further, the method may be used to disable all PJL commands, or only a subset of the PJL commands.

Accordingly, a method is provided for temporarily disabling printer job language (PJL) commands in a printer device. In a printer device, an electronically formatted print job is accepted with embedded PJL commands. The method parses the print job, and in doing so, differentiates a first PJL command and a PJL disable command. The print job is automatically processed (as is conventional), while temporarily ignoring the first PJL command in response to the PJL disable command. In one aspect, the printer differentiates the first PJL command enveloping the print job, and the PJL disable command envelopes the first PJL command envelope.

The method processes the print job, while ignoring the first PJL command, by cross-referencing the first PJL command to a first PJL function, nullifying the first PJL function, and processing the first PJL null function. More explicitly, the first PJL command is cross-referenced to the first PJL function by using an enable index including the first PJL function, and a disable index including the first PJL null function. Then, nullifying the first PJL function includes selecting the disable index in response to the PJL disable command.

Additional details of the above-described method, a graphical user interface, and associated machine-readable instructions are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 1:
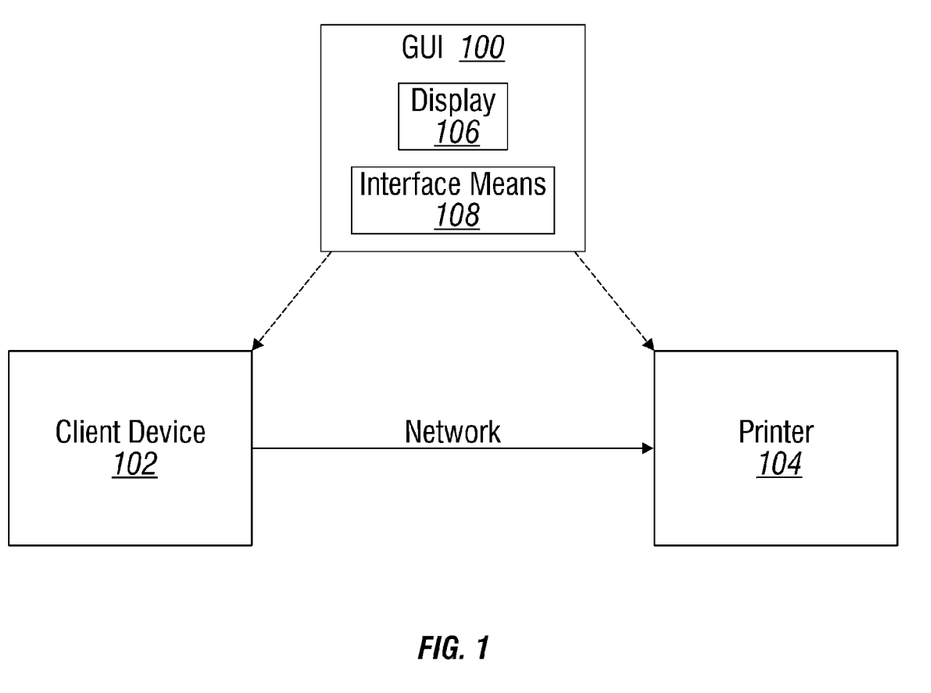
FIG. 1 is a diagram a system for selecting a print job for transmission to a printer.

FIG. 1 is a diagram a system for selecting a print job for transmission to a printer. As represented by the dotted lines, a graphical user interface (GUI) 100 may be embedded in a client device 102 connected to a printer 104, or in the printer 104. The GUI 100 is enabled as a display 106 and an interface means 108 that permits a user to interact or respond to displayed GIU images. The interface means 108 may be a keyboard, mouse, or touchscreen for example.

A GUI presents graphical icons, visual indicators, or special graphical elements called "widgets". Often the icons are used in conjunction with text, labels, or text navigation to fully represent the information and actions available to a user. But instead of offering only text menus, or requiring typed commands, the actions are usually performed through direct manipulation of the graphical elements.

The window, icon, menu, pointing device (WIMP) paradigm of interaction uses a physical input device to control the position of a cursor and presents information organized in windows and represented with icons. Available commands are compiled together in menus and selected through the pointing device. Typically, the user interacts with information by manipulating visual widgets that allow for interactions appropriate to the kind of data held. The widgets of a well-architected interface are functionally independent from and indirectly linked to application functionality, so the GUI can be easily modified.

The visible graphical interface features of an application are sometimes referred to as "chrome". Larger widgets, such as windows, usually provide a frame or container for the main presentation content such as a web page, email message, or drawing. Smaller widgets usually act as a user-input tool.

Figure 2A:
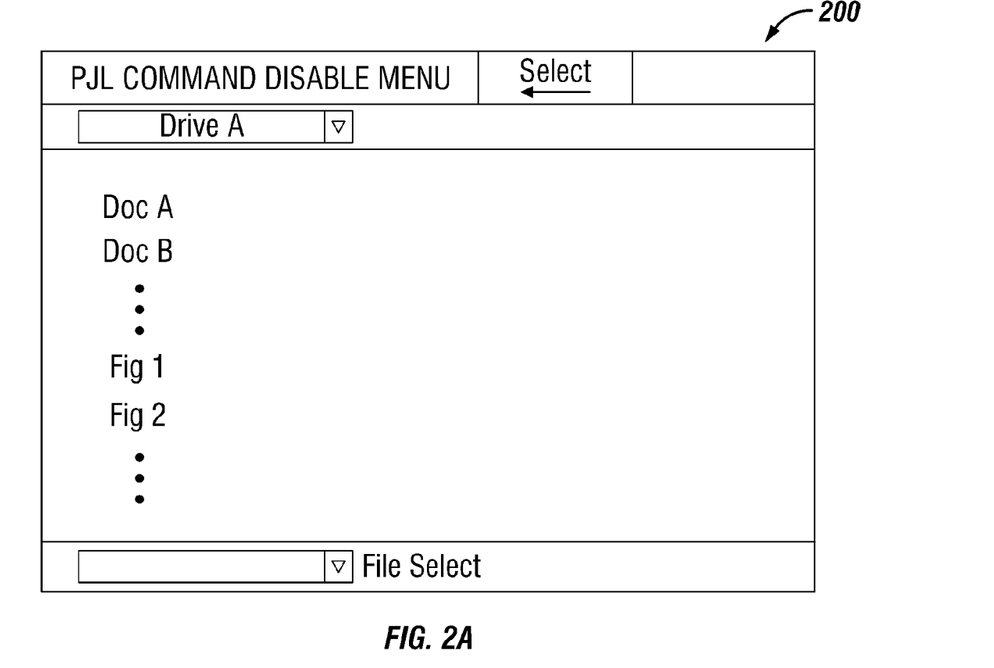
FIGS. 2A through 2E are diagrams depicting an exemplary GUI for temporarily disabling printer job language (PJL) commands.
Figure 2B:
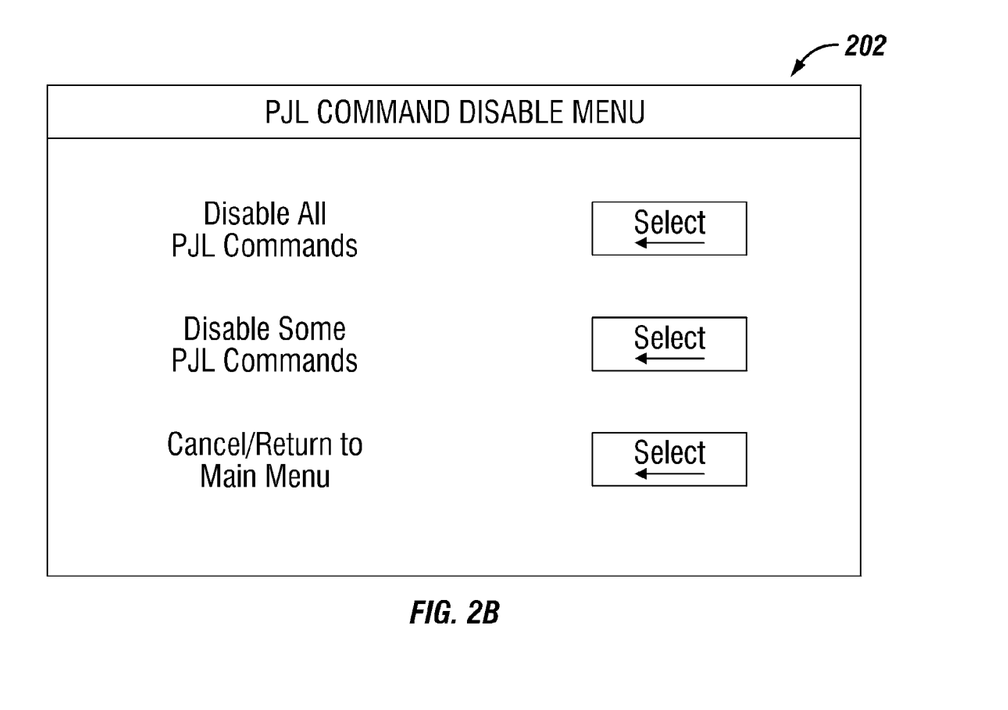

FIGS. 2A through 2E are diagrams depicting an exemplary GUI for temporarily disabling printer job language (PJL) commands. As shown in FIG. 2A, a first graphical icon 200 is used for selecting an electronically formatted print job. In FIG. 2B, a second graphical icon 202 is used for embedding a PJL disable command in the print job, causing the print job to be processed while temporarily ignoring PJL commands. In one aspect, the second graphical icon 202 appears after selecting a document using the first graphical icon 200. Alternately but not shown, the icons may appear on the same screen. It should be understood that the second graphical icon is selectively engagable. For example, the first graphical icon depicts a "button" for selecting the second graphical icon PJL disable menu. The second graphical icon includes a "button" for canceling and returning to the main menu.

Some examples of PJL commands include ENTER, INITIALIZE, RESET, SET, JOB, DEFAULT, ECHO, INFO, INQUIRE, and END-OF-JOB (EOJ) commands. These commands are well understood in the art.

Figure 4:
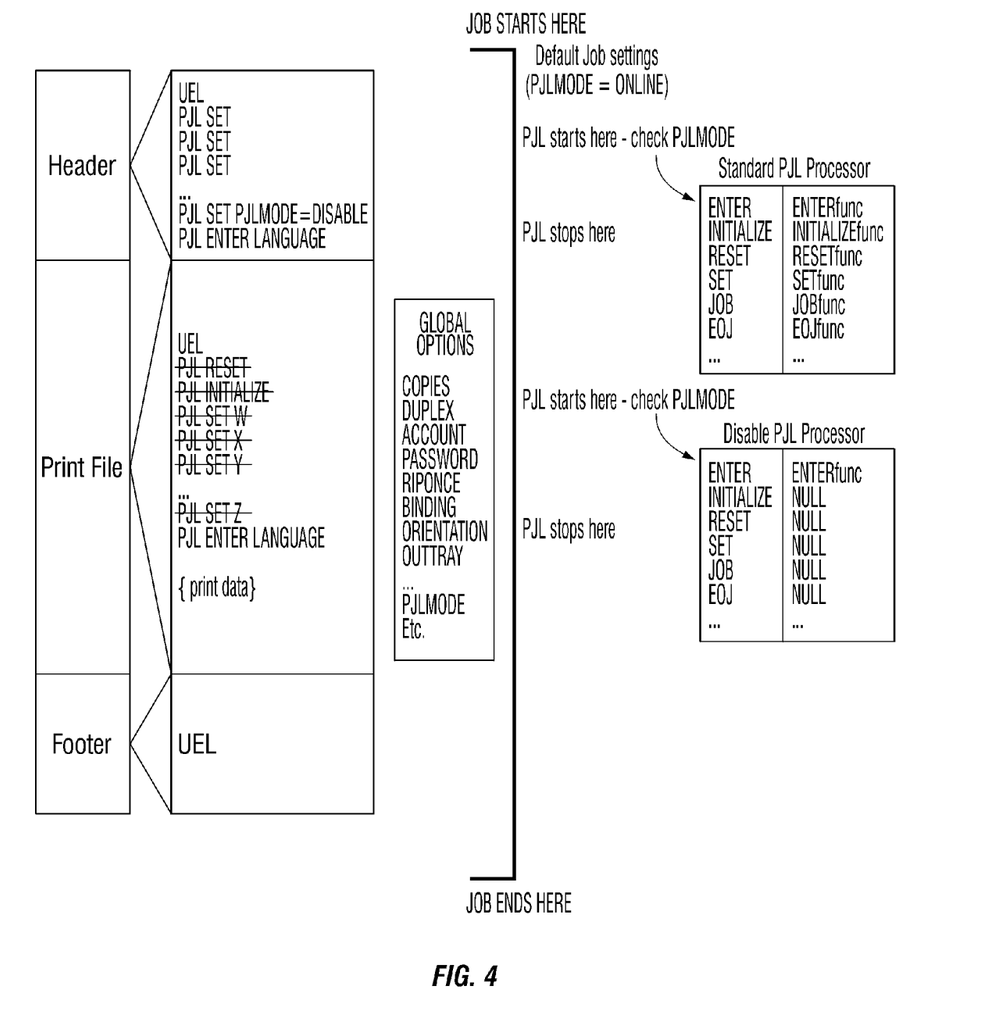
FIG. 4 is a diagram depicting a print job modified to include the PJL disable command.

In one aspect, the first graphical icon 200 selects a print job enveloped with a first PJL command. For example, the first PJL command may be inserted into the print job by a print driver. Then, the second graphical icon 202 envelopes the first PJL command envelop with a disable PJL command envelop. For example, the second graphical icon may embed the PJL disable command in a global job settings envelope. These enveloping processes are illustrated in FIG. 4. In this aspect, the use of a single "button" may be used to disable all PJL commands in the print job.

Figure 2C:
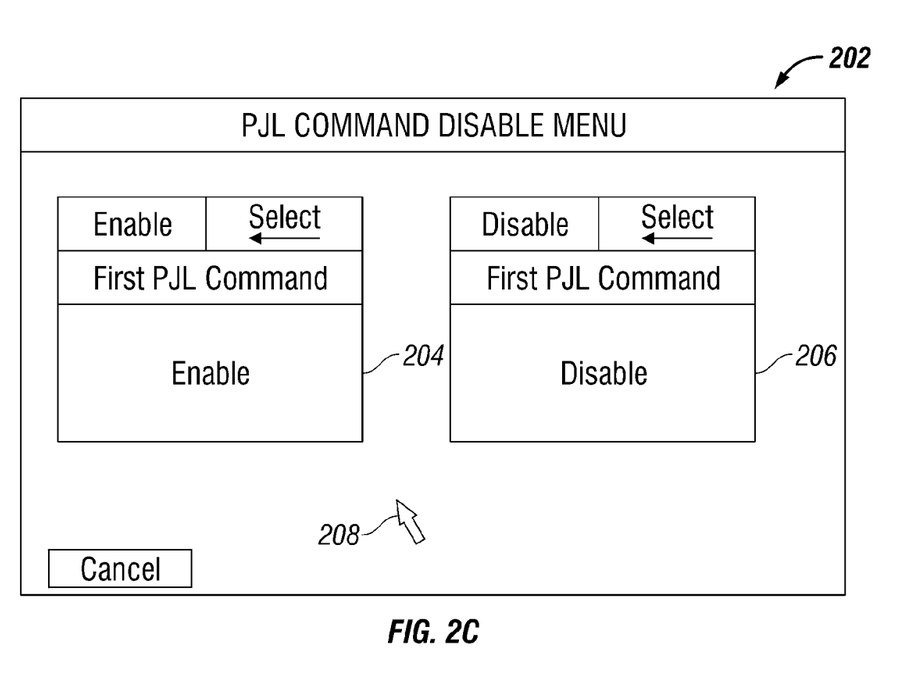

FIG. 2C illustrates a first variation of the second graphical icon PJL disable menu 202 that permits the disablement of PJL commands. For example, the icon 202 may include an enable index graphic 204 including a first PJL function corresponding to the first PJL command. Also shown is a disable index graphic 206 including a first PJL null function corresponding to the first PJL command. The null function is represented to the user as "disable". That is, the selection of the disable index graphics disables the first PJL command. An index selection icon 208 is also shown, such as the arrow conventionally associated with a mouse. For example, the left-click of the mouse arrow over the enable index select "button" enables the first PJL command, while the selection of the disable index select button disables the first PJL command for the print job selected by the first graphical icon. Alternately, the ENABLE and DISABLE "buttons" may be selected using a keyboard.

Figure 2D:
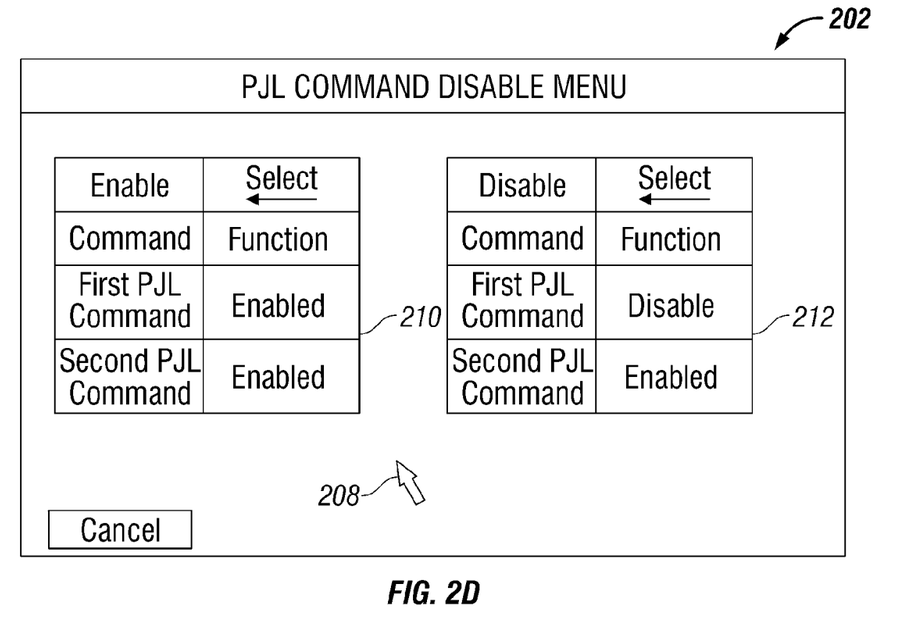

FIG. 2D illustrates a second variation of the second graphical icon PJL disable menu 202 that permits the selective disablement of PJL commands. Shown is an enable index graphic 210 including the first PJL function and a second PJL function corresponding, respectively, with the first and second PJL commands. A first disable index graphic 212 includes a first PJL null function (represented as "disable") corresponding to the first PJL command, and the second PJL function. Also shown is index selection icon 208. By selecting enable index 210, both PJL commands are enabled. By selecting the first disable index 212, the first PJL command is disabled, but not the second PJL command.

Figure 2E:
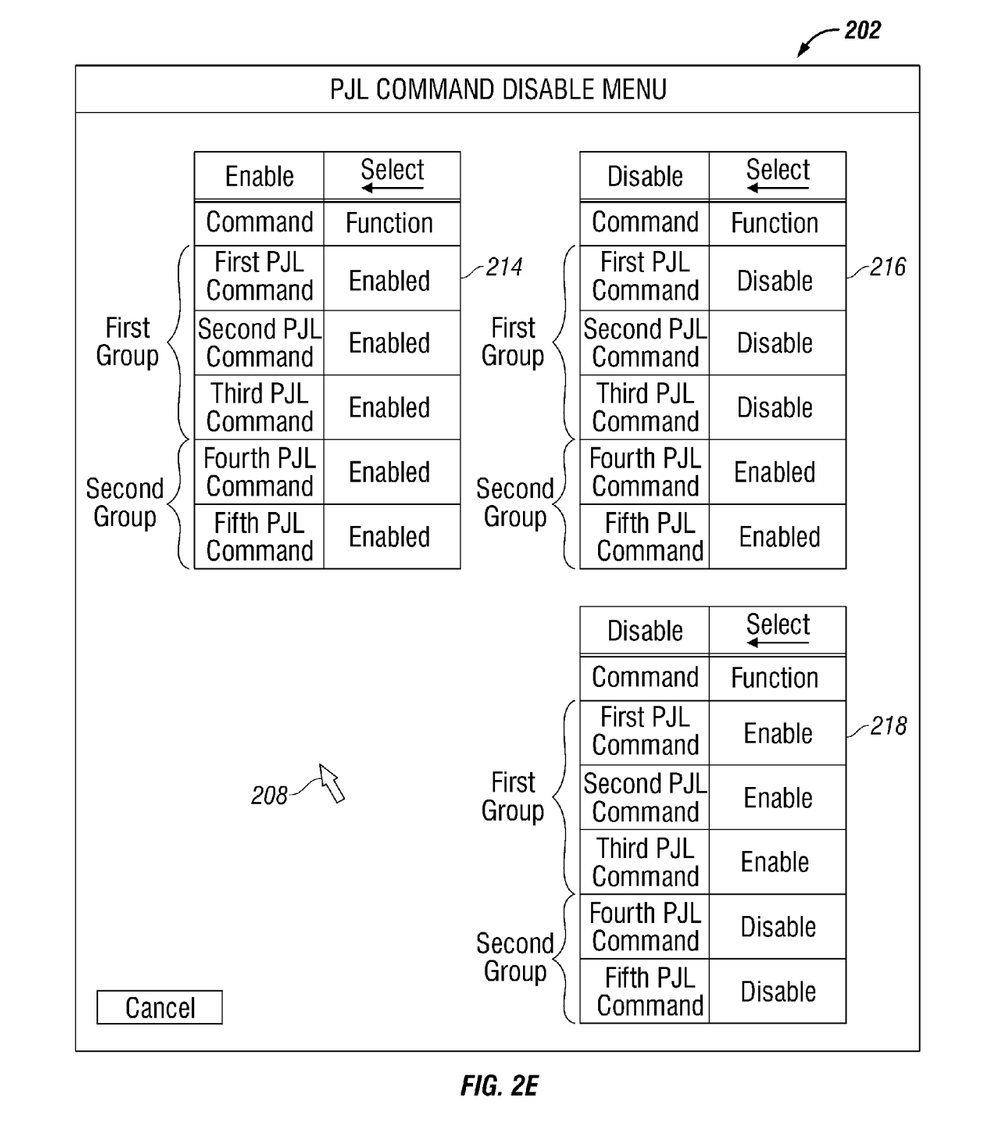

FIG. 2E illustrates a second variation of the second graphical icon PJL disable menu 202 that permits the selective disablement of PJL command groups. An enable index graphic 214 includes a first group of PJL functions and a second group of PJL functions corresponding, respectively, with the first and second groups of PJL commands. A first disable index graphic 216 includes a first group of PJL null functions (represented as "disable") corresponding to the first group of PJL commands, and the second group of PJL functions. Also shown is a second disable index graphic 218 including the first group of PJL functions and a second group of PJL null functions (represented as "disable") corresponding to then second group of PJL commands. With enough disable index graphics all the combinations of enabled and disabled PJL commands can be selected.

It should be understood that the PJL commands, or the sets of PJL commands that may be temporarily disabled is dependent upon the specific configuration of the printer to which the print job is being set. The PJL commands or PJL command groups that are be disabled are preconfigured in the client device memory, or discovered during initialization in the setup communications between the client device and the printer. It should also be understood that different printers may permit different PJL commands, or sets of PJL commands to be disabled.

Although not specifically shown, in another aspect, a graphic is presented of all possible PJL commands, which are automatically selected by default, and the user simply selects the PJL commands or command groups to be disabled. Alternately, the authorized PJL commands are disabled by default and the user selects the PJL commands to be enabled. As another alternative, PJL disable commands may be inserted into a print job using a command line interface (CLI), which requires commands to be typed on a keyboard. As another alternative, PJL disable commands may be added by the MFP or printer device during the processing of certain types of print jobs.

Functional Description

The above-described GUI and the printer-side method described below are superior to existing methods for removing unwanted PJL commands in that the original print content is not compromised, the normal PJL processing is not effected, and the overall performance is not impacted by the overhead of parsing and stripping of PJL commands from a print file. The present invention method may be used in print applications having the capability to support multiple file formats, where some applications source print jobs that require the stripping of PJL commands.

For example, the suspension of PJL commands may be useful in processing PRN files that are generated for a first vendor's printer, but actually printed on a second vendor's printer. Sometimes these embedded files set job parameters that are bothersome. For example, a test file may make 10 copies of a 200 page document. Typically these files are difficult to modify in conventional text editors, so overriding the embedded PJL job parameters is useful. With the present invention method an existing PRN file can be enclosed with a short PJL wrapper, thereby overriding the embedded job parameters.

Typically, print files are submitted to an MFP or printer through some print application. Print files are either "pushed" to the MFP by an application on a host or client computer, or "pulled" by an application internal to the MFP. FIGS. 2A-2E depict a GUI that may be used for either pushing or pulling a print job. If "pulled", an enabled printer-side application appends a special PJL command that disables any further processing of PJL commands in that print job, before the print file enters the internal print pipeline on the MFP. The print file is still processed using the normal print pipeline, but all (or some) PJL commands within that print job are ignored. PJL processing returns to the normal state at the beginning of each job.

In one aspect, the MFP maintains 2 interfaces: one for enabling ALL PJL commands, and one for disabling ALL PJL commands. In other aspects, the MFP may maintain a plurality of interfaces for enabling and disabling individual PJL commands. For example, an enabled print component on the MFP receives a request to print a file. A PJL command is appended to the beginning of the print stream that results in the MFP ignoring the remaining PJL commands in that job. The modified file can be requested from an external server and submitted to the pipeline, so that the print job is processed without any PJL commands.

In one aspect, a PJL Interpreter in the MFP has 2 components; one component that parses the PJL commands, and another component that processes the PJL commands. The parser and processor utilize an interface to map PJL commands to PJL functions. Every PJL command parsed by the PJL parser has an equivalent function in the PJL processor that processes the actual command.

Figure 3:
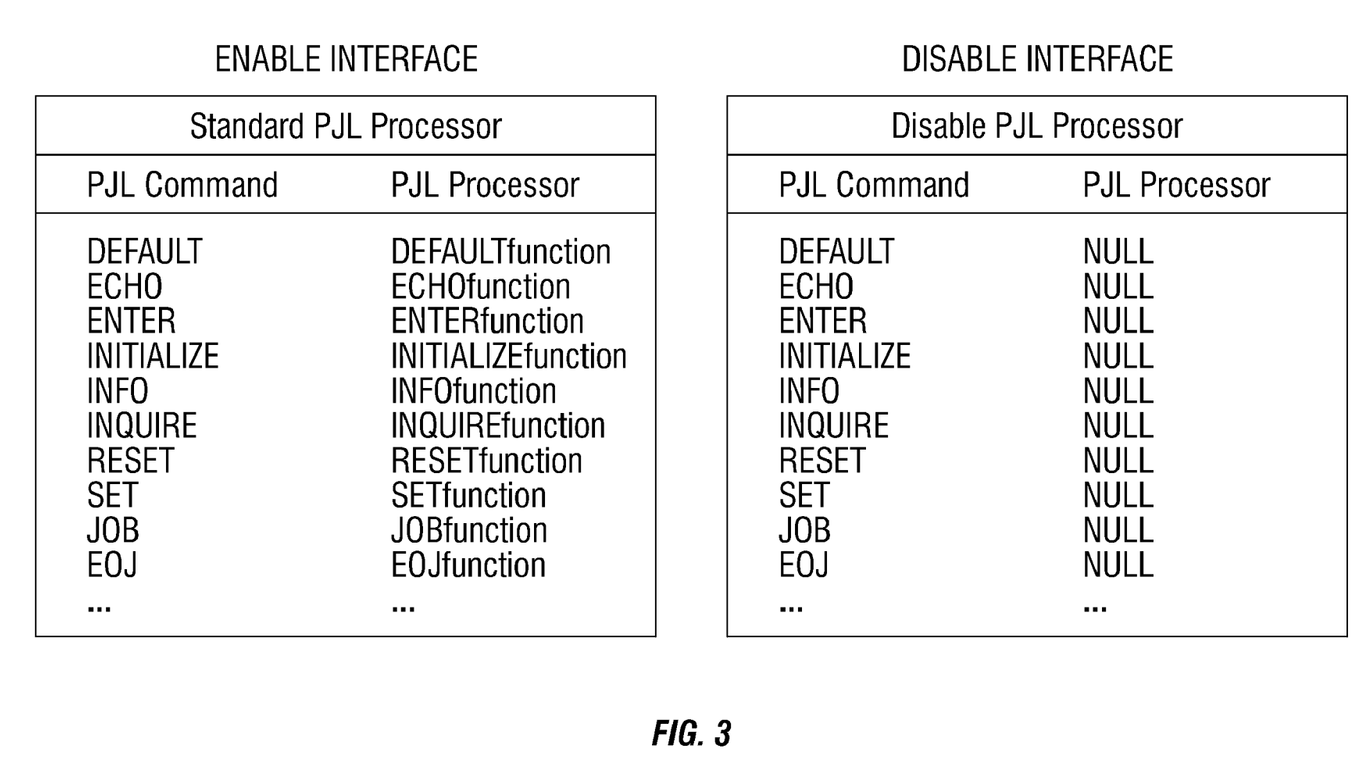
FIG. 3 is a diagram depicting PJL processor interfaces.

FIG. 3 is a diagram depicting PJL processor interfaces. The MFP internally maintains 2 separate interfaces to the PJL processor. One interface contains the normal PJL command functions, and another interface contains null functions. A PJL command, i.e. PJLMODE, is provided to toggle between the 2 interfaces. If the PJLMODE is set to DISABLE, the MFP internally switches to use the PJL interface associated with disable mode, which contains NULL function pointers. A NULL function pointer means the command has no backbone. The PJL command is still recognized by the MFP, but does nothing to affect the current print job. If the PJLMODE is not present or set to ENABLE, the MFP uses the standard PJL interface, which contains actual PJL command function pointers.

The PJLMODE may be included as part of the global job settings. At the start of every job, the job settings are reset to current defaults, which typically set the PJLMODE to ENABLE. In this aspect, PJLMODE is explicitly set to DISBALE through a PJL command within the print stream, and can be dynamically modified for every job. The DISABLE table may be customized to disable any number of PJL commands, or disable all commands.

FIG. 4 is a diagram depicting a print job modified to include the PJL disable command. As noted above, the MFP may maintain 2 interfaces: one for enabling ALL PJL commands, and one for disabling ALL PJL commands. In other aspects not shown here (see FIG. 2E), the MFP may maintain a plurality of interfaces for enabling and disabling individual PJL commands. As seen in FIG. 4, a PJL disable command (PJL SET PJLMODE=DISABLE) occurs after PJL SET in the print job header. Thereafter, all the PJL commands associated with the print file (e.g., PJL RESET) are ignored. At the beginning of each print job, the PJL processor is returned to the default condition, which is the standard or ENABLE PJL processor interface. In one aspect as shown, the PJL disable command is discovered in the global settings and inserted into the print job header by the printer. This diagram depicts the envelopment of PJL commands by a PJL disable command envelope.

Figure 5:
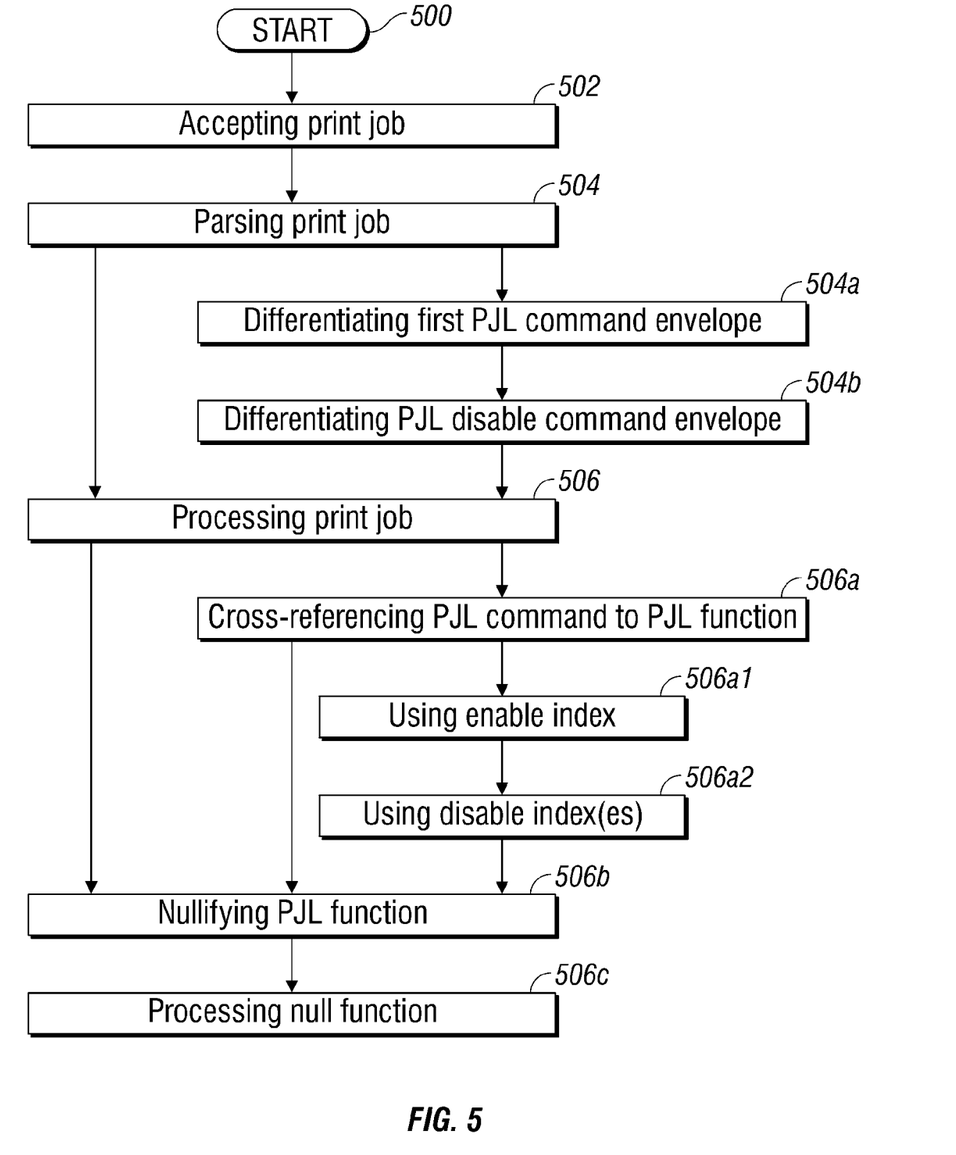
FIG. 5 is a flowchart illustrating a method for temporarily disabling PJL commands in a printer device.

FIG. 5 is a flowchart illustrating a method for temporarily disabling PJL commands in a printer device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

In a printer device, Step 502 accepts an electronically formatted print job with embedded PJL commands. Step 504 parses the print job, differentiating a first PJL command and a PJL disable command. Some examples of PJL commands include ENTER, INITIALIZE, RESET, SET, JOB, DEFAULT, ECHO, INFO, INQUIRE, and END-OF-JOB (EOJ) commands. In response to the PJL disable command, Step 506 automatically processes the print job, while temporarily ignoring the first PJL command. The PJL disable command is selectively engagable.

In one aspect, differentiating the first PJL command and the PJL disable command in Step 504 includes substeps. Step 504*a* differentiates the first PJL command enveloping the print job. Step 504*b* differentiates the PJL disable command enveloping the first PJL command envelope. Alternately stated, Step 504 differentiates the PJL disable command embedded in a global job settings envelope.

In one aspect, automatically processing the print job in Step 506, ignoring the first PJL command, includes substeps. Step 506*a* cross-references the first PJL command to a first PJL function. Step 506*b* nullifies the first PJL function. Step 506*c* processes the first PJL null function. In another aspect, cross-referencing the first PJL command to the first PJL function in Step 506*a* includes substeps. Step 506*a*1 uses an enable index including the first PJL function. Step 506*a*2 uses a disable index including the first PJL null function. Then, nullifying the first PJL function in Step 506*b* includes selecting the disable index in response to the PJL disable command.

In a different aspect, Step 504 parses the print job to differentiate the first PJL command and a second PJL command, and Step 506 additionally includes automatically processing the print job in response to the second PJL command. More explicitly, Step 504*a* may differentiate the second PJL command followed by the first PJL command, both enveloping the print job, and Step 504*b* differentiates the PJL disable command enveloping the first PJL command envelope, but not the second PJL command.

To continue this aspect, Step 506*a* cross-references the first PJL command to a first PJL function and the second PJL command to a second PJL function. Step 506*b* nullifies the first PJL function, and Step 506*c* processes the first PJL null function and second PJL function. In a related variation, Step 506*a*1 uses an enable index including the first PJL function and second PJL function. Step 506*a*2 uses a disable index including the first PJL null function and the second PJL function. Then, Step 506*b* selects the disable index in response to the PJL disable command.

In another related aspect, Step 506*a*1 uses an enable index including a plurality of PJL functions corresponding the plurality of PJL commands. Step 506*a*2 uses a first disable index including a first group of PJL null functions corresponding to the first group of PJL commands, and a second disable index including a second group of PJL null functions associated with the second group of PJL commands. Then, Step 506*b* selects either the first or second disable index.

In a different aspect of the method, differentiating the PJL disable command in Step 504 includes inserting the PJL disable command into a first print job header, prior to the first PJL command. In another variation Step 504 is enabled by recognizing a first print job based upon criteria such as the print job source and the print job type. For example, a print job from an Open System or Web Service source may be differentiated. Such a source may support interoperable Machine-to-Machine interaction over a network. A Web Service may be a Web application programming interface (API) that can be accessed over a network, such as the Internet, and executed on a remote system hosting the requested services. For example, the term may refer to clients and servers that communicate using XML messages that follow the simple object access protocol (SOAP) standard. Common in both the field and the terminology is the assumption that there is also a machine-readable description of the operations supported by the server written in the Web Services Description Language (WSDL). Some examples of print job types that may be differentiated in Step 504 as requiring the PJL disable command include copy jobs, queue printing jobs, facsimile jobs, and stored print jobs.

The above-described flowchart may also be interpreted as an expression of a machine-readable medium having stored thereon instructions for temporarily disabling PJL commands. In this aspect the instructions would enable Steps 502 through 506, as described above.

System and methods for temporarily disabling or suspending PJL commands have been provided. Examples of explicit interfaces and process steps have been used to illustrate the invention. However, the invention is not limited to merely these examples. Other variations and embodiments of the invention will occur to those skilled in the art.

I claim:

1. In a printer device, a method for temporarily disabling printer job language (PJL) commands, the method comprising:
    in a printer device, accepting an electronically formatted print job with embedded PJL commands;
    parsing the print job, differentiating a first PJL command and a PJL disable command; and,
    in response to the PJL disable command, automatically processing the print job, while temporarily ignoring the first PJL command.

2. The method of claim 1 wherein differentiating the first PJL command includes differentiating a PJL command selected from a group consisting of ENTER, INITIALIZE, RESET, SET, JOB, DEFAULT, ECHO, INFO, INQUIRE, and END-OF-JOB (EOJ) commands.

3. The method of claim 1 wherein differentiating the first PJL command and the PJL disable command includes:
    differentiating the first PJL command enveloping the print job; and,
    differentiating the PJL disable command enveloping the first PJL command envelope.

4. The method of claim 3 wherein differentiating the PJL disable command enveloping the first PJL command envelope includes differentiating the PJL disable command embedded in a global job settings envelope.

5. The method of claim 1 wherein temporarily ignoring the first PJL command in response to the PJL disable command includes ignoring the first PJL command in response to a selectively engagable PJL disable command.

6. The method of claim 1 wherein automatically processing the print job, ignoring the first PJL command, includes:
    cross-referencing the first PJL command to a first PJL function;
    nullifying the first PJL function; and,
    processing the first PJL null function.

7. The method of claim 6 wherein cross-referencing the first PJL command to the first PJL function includes:
    using an enable index including the first PJL function;
    using a disable index including the first PJL null function; and,
    wherein nullifying the first PJL function includes selecting the disable index in response to the PJL disable command.

8. The method of claim 6 wherein differentiating the first PJL command includes differentiating a plurality of PJL commands comprising a first group and a second group;
    wherein cross-referencing the first PJL command to a first PJL function includes;

using an enable index including a plurality of PJL functions corresponding the plurality of PJL commands;

using a first disable index including a first group of PJL null functions corresponding to the first group of PJL commands, and a second disable index including a second group of PJL null functions associated with the second group of PJL commands;

wherein nullifying the first PJL function includes the PJL disable command selecting an disable index from a group consisting of the first and second disable indexes.

9. The method of claim 1 wherein differentiating the first PJL command includes parsing the print job to differentiate the first PJL command and a second PJL command; and, wherein automatically processing the print job, ignoring the first PJL command, includes automatically processing the print job in response to the second PJL command.

10. The method of claim 9 wherein differentiating the first PJL command and a second PJL command includes:

differentiating the second PJL command followed by the first PJL command, both enveloping the print job; and, differentiating the PJL disable command enveloping the first PJL command envelope, but not the second PJL command.

11. The method of claim 9 wherein automatically processing the print job in response to the second PJL command includes:

cross-referencing the first PJL command to a first PJL function and the second PJL command to a second PJL function;

nullifying the first PJL function; and, processing the first Pa null function and second PJL function.

12. The method of claim 11 wherein cross-referencing the PJL commands to PJL functions includes:

using an enable index including the first PJL function and second PJL function;

using a disable index including the first PJL null function and the second PJL function; and, wherein nullifying the first PJL function includes selecting the disable index in response to the PJL disable command.

13. The method of claim 1 wherein differentiating the PJL disable command includes:

recognizing a first print job based upon criteria selected from a group consisting of the print job source and the print job type; and, inserting the PJL disable command into a first print job header, prior to the first PJL command.

14. A tangible computer-readable medium having stored thereon instructions for enabling a printer application graphical user interface (GUI) for temporarily disabling printer job language (PJL) commands, the computer-readable medium instructions for enabling the GUI comprising:

a first graphical icon for selecting an electronically formatted print job; and, a second graphical icon for embedding a PJL disable command in the print job, causing the print job to be processed while temporarily ignoring PJL commands.

15. The tangible computer-readable medium with instructions for enabling the GUI of claim 14 wherein the first graphical icon selects a print job enveloped with a first PJL command; and, wherein the second graphical icon envelopes the first PJL command envelop with a disable PJL command envelop.

16. The tangible computer-readable medium with instructions for enabling the GUI of claim 15 wherein the second graphical icon embeds the PJL disable command in a global job settings envelope.

17. The tangible computer-readable medium with instructions for enabling the GUI of claim 14 wherein the second graphical icon is selectively engagable.

18. The tangible computer-readable medium with instructions for enabling the GUI of claim 14 wherein the first graphical icon selects a print job embedded with a first PJL command;

wherein the second graphical icon supplies:

an enable index graphic including a first PJL function corresponding to the first PJL command;

a disable index graphic including a first PJL null function corresponding to the first PJL command; and, an index selection icon.

19. The tangible computer-readable medium with instructions for enabling the GUI of claim 18 wherein the first graphical icon selects a print job embedded with a first PJL command and a second PJL command;

wherein the second graphical icon provides;

an enable index graphic including a first PJL function and a second PJL function corresponding, respectively, with the first and second PJL commands;

an disable index graphic including a first PJL null function corresponding to the first PJL command, and the second PJL function; and, an index selection icon.

20. The tangible computer-readable medium with instructions for enabling the GUI of claim 18 wherein the first graphical icon selects a print job embedded with a plurality of PJL commands including a first group and a second group;

wherein the second graphical icon provides:

an enable index graphic including a first group of PJL functions and a second group of PJL functions corresponding, respectively, with the first and second groups of PJL commands;

a first disable index graphic including a first group of PJL null functions corresponding to the first group of PJL commands, and the second group of PJL functions;

a second disable index graphic including the first group of PJL functions and a second group of PJL null functions corresponding to then second group of PJL commands; and, an index selection icon.

21. A tangible machine-readable medium having stored thereon instructions for temporarily disabling printer job language (PJL) commands, the tangible machine-readable medium instructions comprising:

accepting an electronically formatted print job with embedded PJL commands;

parsing the print job, differentiating a first PJL command and a PJL disable command; and, in response to the PJL disable command, automatically processing the print job, while temporarily ignoring the first PJL command.

22. The tangible machine-readable medium instructions of claim 21 wherein temporarily ignoring the first PJL command in response to the PJL disable command includes ignoring the first PJL in response to a selectively engagable PJL disable command.

23. The tangible machine-readable medium instructions of claim 21 wherein the PJL disable command is differentiated in response to a process selected from a group consisting of:

parsing PJL commands in a print job header to discover the PJL disable command; and, recognizing the print job based upon criteria selected from a group consisting of the print job source and the print job type, and inserting the PJL disable command into the print job header.

* * * * *

UNITED STATES PATENT AND TRADEMARK OFFICE
CERTIFICATE OF CORRECTION

PATENT NO. : 8,228,515 B2  
APPLICATION NO. : 12/037883  
DATED : July 24, 2012  
INVENTOR(S) : Lena Sojian Page 1 of 1

It is certified that error appears in the above-identified patent and that said Letters Patent is hereby corrected as shown below:

In Claim 11, column 9, line 33, the term "PJL" has been incorrectly printed as "Pa".

Signed and Sealed this  
Ninth Day of October, 2012

David J. Kappos  
*Director of the United States Patent and Trademark Office*